(12) United States Patent  
d'Hautefeuille et al.

(10) Patent No.: US 6,522,788 B1  
(45) Date of Patent: Feb. 18, 2003

(54) IMAGING APPARATUS WITH OFFSET COMPENSATION

(75) Inventors: Renaud d'Hautefeuille, Paris (FR); Vincent Fraysse, Ivry sur Seine (FR)

(73) Assignee: Sagem SA (FR)

( * ) Notice: Subject to any disclaimer, the term of this patent is extended or adjusted under 35 U.S.C. 154(b) by 0 days.

(21) Appl. No.: 09/271,275

(22) Filed: Mar. 17, 1999

(30) Foreign Application Priority Data

Mar. 18, 1998 (FR) ............................................. 98 03308

(51) Int. Cl.[7] .................................................. H04N 5/33
(52) U.S. Cl. ........................................ 382/274; 382/254
(58) Field of Search ................................ 382/274–275, 382/254; 358/1.9; 348/345

(56) References Cited

U.S. PATENT DOCUMENTS

| | | | |
|---|---|---|---|
| 5,557,474 A | 9/1996 | McCrary | 359/820 |
| 6,160,643 A * | 12/2000 | Deschuytere et al. | 358/504 |
| 6,266,127 B1 * | 7/2001 | Iida | 355/38 |
| 6,271,940 B1 * | 8/2001 | Deschuytere et al. | 358/504 |
| 6,317,194 B1 * | 11/2001 | Suzuki et al. | 352/159 |

FOREIGN PATENT DOCUMENTS

| | | |
|---|---|---|
| EP | 0549446 | 6/1993 |
| EP | 0647064 | 9/1994 |
| FR | 2673794 | 9/1992 |

OTHER PUBLICATIONS

Patents Abstracts of Japan, vol. 014, No. 502 (E_0997), Nov. 2, '90 & JP 02 306976 A (Fujitsu Ltd.) Aug. 16, '90–Abstract–See Fig. 2 Japanese document.

* cited by examiner

*Primary Examiner*—Thomas D. Lee  
*Assistant Examiner*—Stephen Brinich  
(74) *Attorney, Agent, or Firm*—Larson & Taylor, PLC

(57) ABSTRACT

The imaging apparatus comprises a detector constituted by a two-dimensional matrix of opto-electronic sensors and by correction means for correcting the output signals in order to compensate for the differences between the response characteristics of the various sensors by applying respective offset values and stored gains thereto. An optical plate is temporarily interposed on the inlet beam, which plate is sufficiently diffusing to make the illumination received from the observed scene uniform over all of the sensors. The offset value for each sensor is calculated from the output signals of the sensors while they receive the uniform illumination, taking the stored gains into account.

9 Claims, 2 Drawing Sheets

IMAGING APPARATUS WITH OFFSET COMPENSATION

BACKGROUND OF THE INVENTION

The present invention relates to imaging apparatuses of the kind having a detector constituted by a two-dimensional matrix of opto-electronic sensors. It has a particularly important, although not exclusive, application to projectiles homing to a target and optionally self-propelled, and in particular to air-to-ground missiles.

At present, apparatuses for imaging a scene as seen by a missile generally comprise a detector constituted by a two-dimensional matrix of opto-electronic sensors of small dimensions, and an inlet optical system incorporating a steerable mirror or "heliostat" which performs two functions. Firstly it enables a target situated in the scene to be kept within the field of view of the detector. Secondly, given that the characteristics of the opto-electronic sensors always present a certain amount of dispersion, it enables them to be calibrated by forming the image of a common source on all of the sites or sensors of the matrix.

In general, the correction means for reducing the effect of dispersion in the characteristics operate on the assumption that the response curve of each of the sensors can be caused to coincide with that of a reference photosensitive site or sensor by means of a linear transformation of the form:

$$y_n = a_n \cdot x_n + b_n$$

where $a_n$ and $b_n$ are a gain and an offset assigned to the sensor of order n, enabling a corrected value $y_n$ to be obtained from each output signal $x_n$.

Conventionally, the gains $a_n$ are determined in the factory for each matrix for scenes at a plurality of different temperatures. In operation, the set of gains corresponding to the temperature that is closest to the mean temperature of the scene is selected. Offset $b_n$ is determined in the missile itself when it is put into operation by calculation performed by forming an image of the source on the sensors.

Inlet optical systems having a steerable mirror require apparatus to servo-control the attitude of the mirror. Such apparatus is bulky and expensive.

SUMMARY OF THE INVENTION

It is an object of the present invention to provide an imaging apparatus enabling offset to be corrected on implementation, without requiring a deflector mirror.

To this end, the invention provides, in particular, imaging apparatus comprising a detector constituted by a two-dimensional matrix of opto-electronic sensors and means for correcting the output signals from the detector in order to compensate for the differences between the response characteristics of the various sensors by applying a stored gain and an offset. The apparatus comprises means for temporarily interposing an optical plate on the inlet beam coming from an observed scene and going towards the matrix, the plate being sufficiently diffusing to make the illumination received from the observed scene uniform over all of the sensors, and means for deducing the offset values from the output signals of the sensors receiving the uniform illumination and from the stored gains.

The need, in order to implement the invention, to have a detector with a number of sensors that is sufficient to accommodate deviations of the target from the axis of the system while conserving sufficient resolution (which would have been a drawback a few years ago), does not present any difficulty at present given that detectors are available with a large number of elements at acceptable price and with dispersion that can be compensated. This need will be even more acceptable in the future since detectors with even higher numbers of photosensitive sites are under development.

The above characteristics and others will appear more clearly on reading the following description of a particular embodiment given by way of example. The description refers to the accompanying drawings.

DESCRIPTION OF A PREFERRED EMBODIMENT

Figure 1:
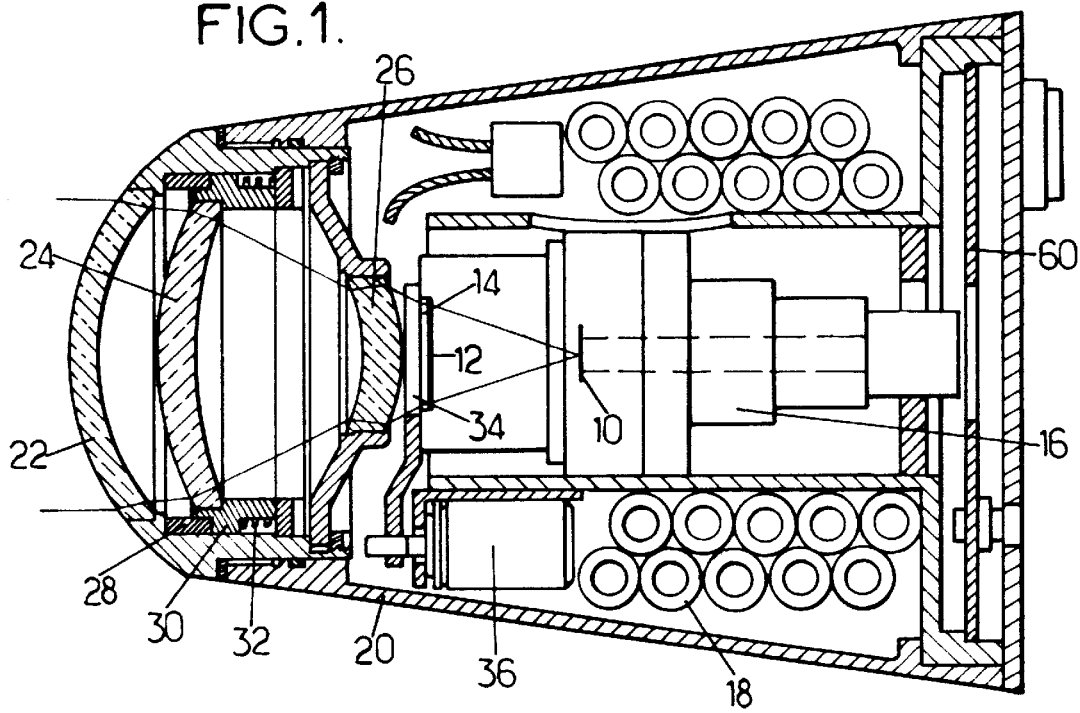
FIG. 1 is a simplified section view through imaging apparatus suitable for implementing the invention.
Figure 2:
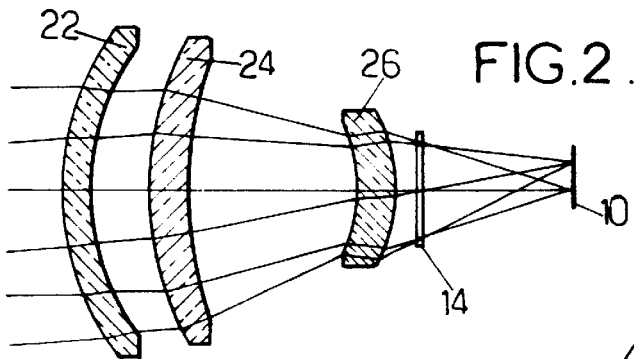
FIG. 2 is a diagram of an inlet optical system usable in the imaging apparatus of FIG. 1.

The imaging apparatus whose components concerned by the invention are shown diagrammatically in FIG. 1 has a detector 10 constituted by a matrix of photosensitive sites or "sensors". This matrix is placed in a cryostat having an inlet window 12. In the frequently-arising situation where the imaging apparatus is designed to form its images in the infrared, the window 12 is preceded by an infrared filter 14 for improving selectivity. A cooler 16 carries the detector 10. The cooler must be rapid-acting. For example it is possible to use the Stirling cycle or the Joule-Thomson cycle. In the example shown, it is fed from a coiled gas tank 18.

In a missile having a nosecone 20 and carrying imaging apparatus for the purpose of providing an infrared image, the optical system for forming an image of the scene can be constituted by three refractive elements that are transparent in the infrared. The first element is an inlet porthole 22 made of a material which is both transparent in the infrared and capable of withstanding environmental conditions. The second element (the middle element) is a converging meniscal lens 24, and the third element is an outlet lens 26. These three elements can be made respectively out of magnesium fluoride, silicon, and zinc selenide. The outlet lens 26 will generally be aspherical in order to reduce aberrations and be subjected to antireflection treatment. To maintain focusing in spite of temperature variations, a temperature-compensating spacer 28 is interposed between the nose and the ring 30 on which the meniscal lens 24 is mounted. It has a coefficient of thermal expansion that is appropriate for the optical system. As it expands, the spacer urges the meniscal lens 24 rearwards against opposing force from a spring 32.

Figure 3:
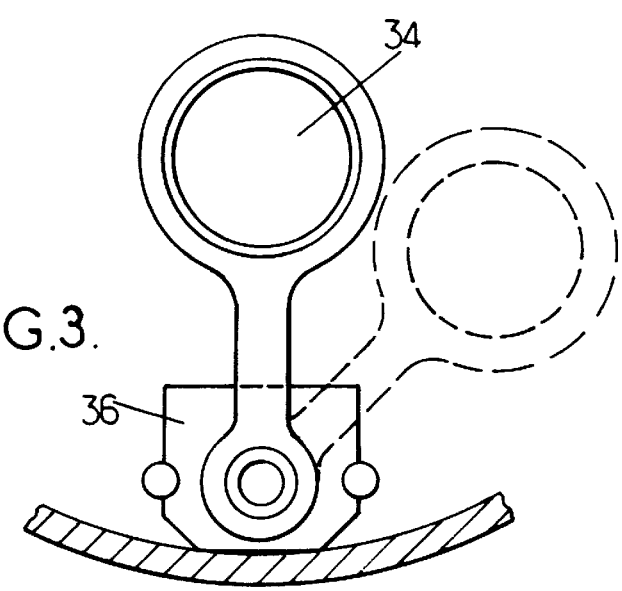
FIG. 3 shows one possible way of mounting the moving diffusing plate inside the FIG. 1 apparatus.

For implementing the invention, the apparatus has a diffusing optical plate 34 that can be moved by a motor 36 between a position in which it is interposed on the inlet light beam, between the outlet lens 26 and the cryostat, and a position in which it allows the beam to pass freely, as shown in dashed lines in FIG. 3. The optical characteristics of the plate are selected as a compromise. It must diffuse sufficiently to ensure that all of the photosensitive sites see the same mean level of illumination of the scene. It must also have sufficiently transmission in the sensitivity range of the detector to enable significant measurement to be performed in a short period of time. In practice, its coefficient of transmission will generally be greater than 60%, thus avoiding any need to lengthen excessively the time required for integrating charge in the photosensitive sites in order to evaluate offset.

Figure 4:
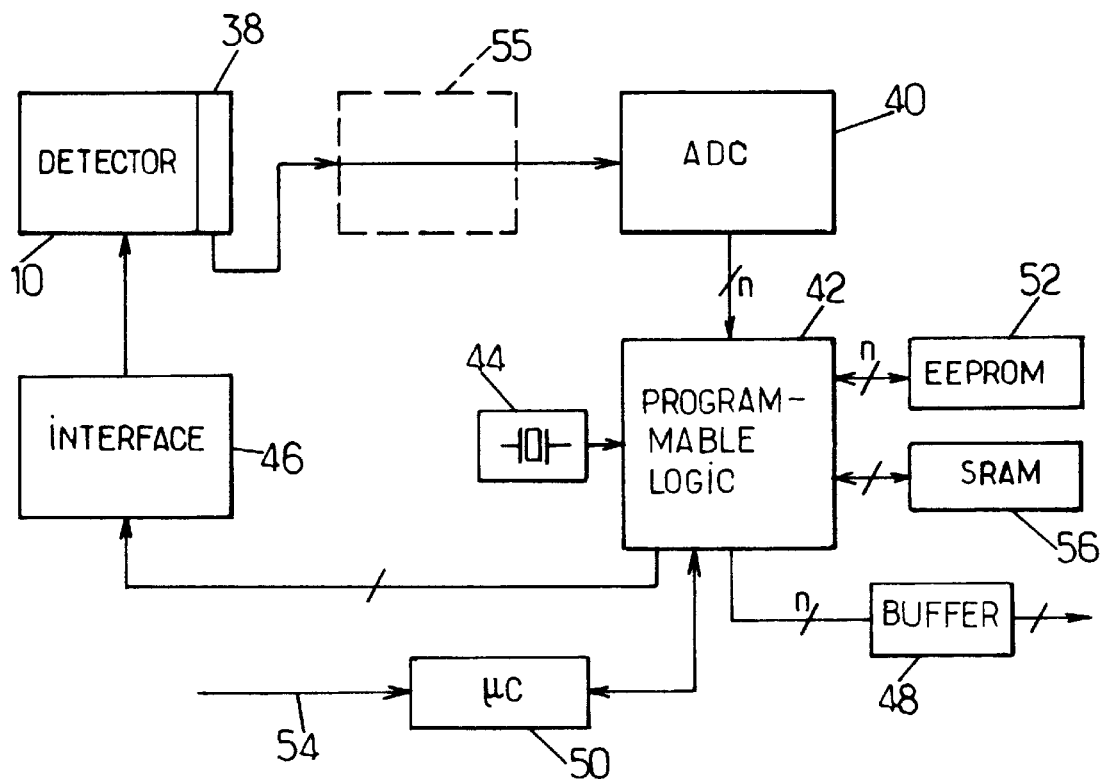
FIG. 4 is a block diagram of an electronic circuit suitable for use in the apparatus of FIG. 1.

The electronics of the system can have the general structure shown in FIG. 4. The outlet register 38 from the detector 10 is connected to an analog-to-digital converter 40 which delivers a series of digital signals representative of the amounts of charge on each of the sites, digitized on n bits. Digitizing on n=12 bits is generally satisfactory. A calculation element 42, possibly constituted by a programmable logic circuit driven by a clock 44, is provided to perform gain and offset corrections. This element also controls a driver interface 46 which supplies the detector 10 with clock signals, the necessary bias voltages, and orders for transfer to the register 38 and for reading from the register 38.

The signals representing corrected values of the illumination received by the photosensitive sites are delivered by the calculation element 42 to an n-bit output, generally via a buffer 48.

The device shown also has a microcontroller 50 for controlling the calculation element 42, and in particular for selecting between the various gain sets stored in a non-volatile memory 52 and also for controlling calibration operations. The microcontroller will generally be connected to a system for causing the imaging apparatus to be put into operation (e.g. an arming system) via a serial link 54.

The apparatus also has read/write (RAM) memory 56 in which the offset values are stored after the calibration operation. Given that both a read operation and a write operation are required at a single site when it is desired to calculate a mean in the manner defined below, the read/write memory 56 will generally be implemented as a fast static RAM.

When the detector delivers its information on a plurality of interlaced outputs, a multiplexer 55 is interposed between the output register 38 and the ADC 40.

As mentioned above, the corrections performed on the output signals delivered by the defector consist in replacing the value $x_n$ output by photosensitive site of order n with a value $y_n$ of the form:

$$y_n = a_n \cdot x_n + b_n$$

Values of $a_n$ are stored in the read-only memory 52 and they are determined in the factory. As a general rule, several sets of coefficients $a_n$ are used. Before a mission, a particular set of coefficients is selected for use, e.g. as a function of ambient temperature, and the selection is conveyed, e.g. via the serial link 54. It is also possible to make the selection immediately before taking an image, after measuring the temperature of the scene. The set of gains can correspond to various temperature ranges from −30° C. up to +70° C.

Offset values can be determined as follows.

When the optical system is already aimed at the scene of which an image is to be formed, the motor is actuated to bring the blade 34 onto the path of the inlet beam. A first measurement is performed. The interface can be designed to give a longer duration to integration than the duration used for imaging, so as to compensate for the known absorption of the plate. The output signal delivered by each photosensitive site of order n is corrected by applying the respective gain a, and then the corrected output signals are compared, one by one, with a reference signal in order to obtain a difference $R_n$ which is stored.

In practice, a plurality of values for $R_n$ (e.g. 16 values) are summed in order to reduce time noise. If in addition the direction in which the optical system is pointed changes slightly between a plurality of successive measurements, then additional compensation occurs for non-uniformities of the plate.

The summed total of the differences $R_n$, $R'_n$, $R''_n$, etc. is divided by the number of differences summed so as to determine the offset value for each photosensitive site of order n. Summing can be performed very simply by reading the appropriate location in the RAM 56, by adding thereto the difference R as measured by the logic circuit 42, and by writing the result back to the RAM 56.

Once the final offset values have been calculated and stored, an image is formed of the scene, possibly also by summing a plurality of integrations on the detector. The results obtained can be corrected in simple manner, merely by subtracting the mean offset stored in the memory 56.

All of the components constituting the electronics can be carried on a printed circuit card 60 of annular shape placed behind the cryostat 16 (FIG. 1).

We claim:

1. Imaging apparatus comprising:
   a detector constituted by a two-dimensional matrix of opto-electronic sensors;
   means for correcting output signals of the sensors of said detector in order to compensate for differences between response characteristics of various ones of said sensors by applying a stored gain and an offset to an output of each of said sensors;
   means for temporarily interposing an optical plate on an inlet light beam originating from an observed scene and directed towards the detector, said optical plate being sufficiently diffusing to make an illumination received from the observed scene uniform over all of the sensors;
   means for deducing values of said offsets from the output signals of the sensors when receiving the uniform illumination and from the stored gains; and
   means for applying the stored gain values and the values of said offsets to the output signals of said sensors when observing the scene without said optical plate.

2. Apparatus according to claim 1, wherein the plate has a transmission coefficient of at least 60%.

3. Imaging apparatus comprising:
   an inlet optical system provided with a temperature-compensating device that operates by moving a lens by means of a spacer that expands with temperature;
   a detector constituted by a two-dimensional matrix of opto-electronic sensors placed for receiving a light beam from an observed scene through said inlet optical system;
   means for correcting output signal of the sensors of said detector in order to compensate for differences between the response characteristics of various ones of said sensors by applying a stored gain and an offset to an output of each of said sensors;
   means for temporarily interposing an optical plate on an inlet light beam originating from an observed scene and directed towards the detector, said optical plate being sufficiently diffusing to make the illumination received from the observed scene uniform over all of the sensors; and
   means for deducing values of said offsets from the output signals of the sensors when receiving the uniform illumination and from the stored gains.

4. Apparatus according to claim 3, wherein the inlet optical system comprises an inlet porthole, a middle lens and an outlet lens.

5. Apparatus according to claim 4, wherein the inlet porthole is made of $MgF_2$, the middle lens of silicon, and the outlet lens of ZnSe.

6. Imaging apparatus comprising:
   a detector constituted by a two-dimensional array of opto-electronic sensors;
   means for correcting output signals of the sensors of said detector in order to compensate for differences between response characteristics of various ones of said sensors by applying a stored gain and an offset to an output of each of said sensors;
   means for temporarily interposing a diffusing optical plate on an inlet light beam originating from an observed scene and directed towards the detector, said optical plate being sufficiently diffusing to make an illumination received from the observed scene uniform over all of the sensors; and
   means for deducing values of said offsets from the output signals of the sensors when receiving the uniform illumination and from the stored gains;
   wherein the correction means comprise calculating means which receives the digitized output sensors from the sensors and a micro controller for selecting between set of gains stored in a non-volatile memory and for controlling calibration operations.

7. Apparatus according to claim 6, wherein the correction means are arranged to perform at least one sensor read operation while the plate is interposed on the light beam, to correct the output signal provided by each photosensitive site by applying the respective gain a, and then to compare the corrective output signals one by one with a reference signal to obtain a difference which is stored.

8. Apparatus according to claim 7, wherein said correction means are designed to sum a plurality of successive difference values and to average them.

9. Apparatus according to claim 6, wherein the correction means are designed to impart a longer duration to the integration time on the detector during the calibration stage than during stages of imaging the scene, so as to compensate for the absorption of the plate.

* * * * *